United States Patent [19]
Eberle et al.

[11] 3,919,428
[45] Nov. 11, 1975

[54] 2-AMINO-5-(SUBSTITUTED OR UNSUBSTITUTED PHENYLALKYL)1,3,4-THIADIAZOLES FOR TREATING ANXIETY

[75] Inventors: Marcel K. Eberle, Madison; Robert E. Manning, Mountain Lakes, both of N.J.

[73] Assignee: Sandoz Inc., E. Hanover, N.J.

[22] Filed: July 23, 1973

[21] Appl. No.: 381,895

Related U.S. Application Data

[63] Continuation-in-part of Ser. No. 218,558, Jan. 17, 1972, abandoned, and a continuation-in-part of Ser. No. 218,559, Jan. 17, 1972, which is a continuation-in-part of Ser. No. 124,489, March 15, 1971, abandoned.

[52] U.S. Cl. ............................................. 424/270
[51] Int. Cl.$^2$..................................... A61K 31/425
[58] Field of Search ................................. 424/270

[56] References Cited
OTHER PUBLICATIONS
Chem. Abst., 68 (1968) 69001X.
Chem. Abst., 70 (1973) 25366U.

*Primary Examiner*—Stanley J. Friedman
*Attorney, Agent, or Firm*—Gerald D. Sharkin; Robert S. Honor

[57] ABSTRACT

2-Amino-5-(substituted or unsubstituted phenylalkyl)-1,3,4-thiadiazoles, e.g. 2-amino-5-(2-phenethyl)-1,3,4-thiadiazole, prepared, e.g. by ring closure, of corresponding 1-(substituted or unsubstituted phenylalkanoyl)-thiosemicarbazide in a strong acid medium. The compounds are useful as minor tranquilizers and sedative hypnotics.

9 Claims, No Drawings

2-AMINO-5-(SUBSTITUTED OR UNSUBSTITUTED PHENYLALKYL)1,3,4-THIADIAZOLES FOR TREATING ANXIETY

This application is a continuation-in-part of copending application Ser. No. 218,558, filed Jan. 17, 1972, now abandoned and copending application Ser. No. 218,559, filed Jan. 17, 1972, the latter in turn being a continuation-in-part of Ser. No. 124,489, filed Mar. 15, 1971, now abandoned.

This invention relates to the use of certain 2,5-substituted thiadiazoles. More particularly, it relates to the use of certain 2-amino-5-(substituted or unsubstituted phenylalkyl)-1,3,4-thiadiazoles, as minor tranquilizer and sedative hypnotic agents.

The compounds with which this invention is concerned may be represented by the following structural formula:

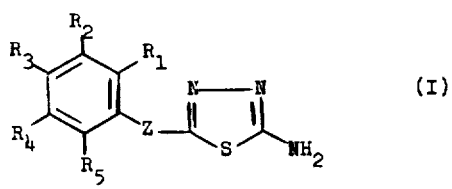

(I)

where $R_1$, $R_2$, $R_3$, $R_4$ and $R_5$ are independently hydrogen, or lower alkyl having 1 to 4 carbon atoms, e.g. methyl, ethyl, propyl, isopropyl, butyl, or isobutyl, and Z is $-(CH_2)_n$ where $n$ is 1, or 2.

The compound of formula (I) where $R_1$, $R_2$, $R_3$, $R_4$ and $R_5$ are hydrogen, and Z is $-(CH_2)_n$ where n is 1, is known and may be prepared according to the methods disclosed in the literature from known starting materials.

All the compounds of formula (I) may be prepared by the following reaction scheme A:

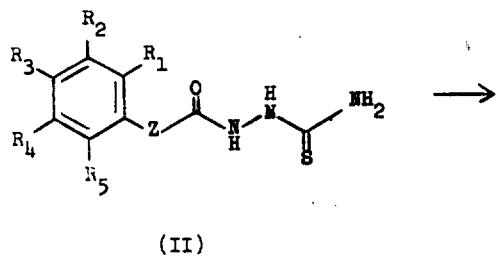

(II)

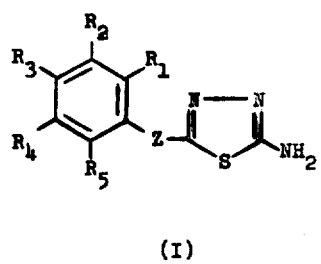

(I)

wherein
$R_1$, $R_2$, $R_3$, $R_4$, $R_5$ and Z have the above stated significance.

The compounds of formula (I) may be prepared by ring closure of a compound of formula (II) in a strong Lewis acid medium such as phosphoric acid, hydrochloric acid, sulfuric acid, and the like, or a halogenated phosphoric acid, such as phosphorous tribromide, at a temperature of from 40° to 100°C., preferably 50° to 65°C. for about 0.5 to 20 hours, preferably 2 to 6 hours. Though a solvent is not necessary, inert aromatic solvents such as benzene, toluene, xylene, chlorobenzene and the like may be used. Neither the temperatures nor the times used are critical.

The compounds of formula (I) may also be prepared by the following reaction scheme B:

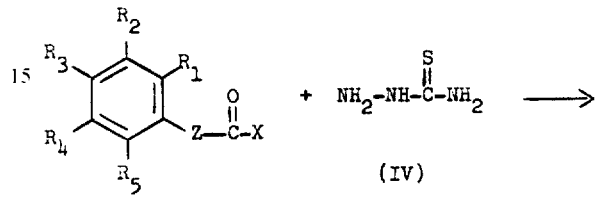

(III)                    (IV)

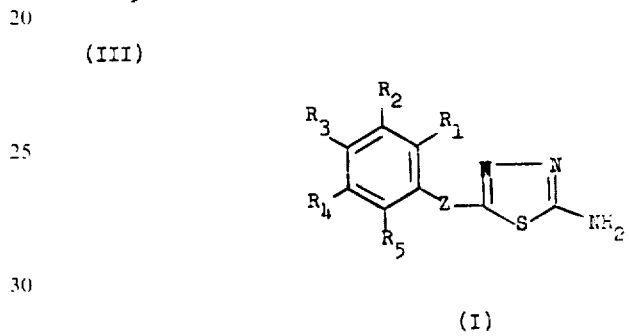

(I)

wherein
$R_1$, $R_2$, $R_3$, $R_4$, $R_5$ and Z have the above stated significance, and X is halo having an atomic weight of 35 to 80.

The compounds of formula (I) may be prepared by treating a substituted or unsubstituted phenylalkanoylhalide, e.g. 3-phenylpropionyl chloride, with thiosemicarbazide in a strong Lewis acid medium such as described respecting scheme A, at a temperature of from 40° to 100°C., preferably 50° to 60°C. for about 0.5 to 20 hours, preferably about 2 to 6 hours. Though a solvent is not necessary, inert solvents such as described respecting scheme A may be used if desired. Neither the temperatures nor the times used are critical.

The compounds of formula (II) may be prepared by the following reaction scheme C:

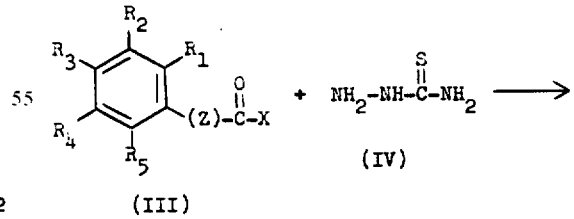

(III)                    (IV)

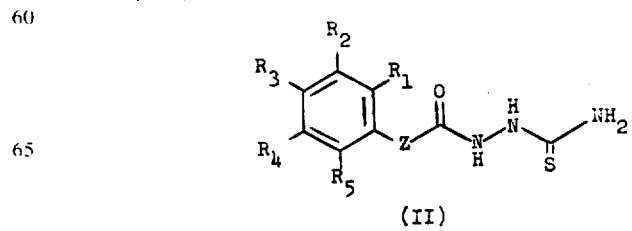

(II)

where
R₁, R₂, R₃, R₄, R₅, Z and X have the above stated significance.

The compounds of formula (II) may be prepared by treating a compound of formula (III) with thiosemicarbazide in an inert solvent such as dialkylformamide, e.g. dimethylformamide, at a temperature of from 0° to 80°C., preferably 15° to 50°C., for about 1 to 24 hours, preferably 2 to 6 hours. Neither the solvents nor the temperature or time used are critical.

The compounds of formulas (I) and (II) may be recovered by conventional recover techniques such as crystallization.

Certain of the compounds of formula (III) are known and may be prepared by methods disclosed in the literature. Those compounds of formula (III) not specifically disclosed may be prepared according to analogous methods from known materials.

The compounds of formula (I) are useful because they possess pharmacological activity in animals. In particular, the compounds are useful as tranquilizers and sedative hypnotics, as indicated in the mouse given typically 24-200 mg/kg of body weight of the active compound and tested using the 30-word adjective test basically as described by Irwin, S. (Gordon Research Conference, Medicinal Chemistry, 1959) and Chen (Symposium on Sedative and Hypnotic Drugs, William and Wilkins, 1954), the chemically induced seizures test basically as described by Orloff, et al., (Proc. Soc. Exp. Biol., 70 : 254, 1949), and the hexobarbital reinduction test, wherein immediately after the animals recover their righting reflex which was lost upon the administration of hexabarbital, "reinduction" is stated to occur if the animals once again lose their righting reflex.

For such usage, the compounds may be administered orally or parenterally as such or admixed with conventional pharmaceutical carriers. They may be administered orally in such forms as tablets, dispersible powders, granules, capsules, syrups and elixirs, and parenterally as solutions, suspensions, dispersions, emulsions, and the like, e.g. a sterile injectable aqueous suspension. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g. inert diluents, such as calcium carbonate, sodium carbonate, lactose and talc, granulating and disintegrating agents, e.g. starch and alginic acid, binding agents, e.g. starch, gelatin and acacia, and lubricating agents, e.g. magnesium stearate, stearic acid and talc. The tablets may be uncoated or coated by known techniques to delay disintegration and absorption in the gastrointestinal tract and thereby provide a sustained action over a longer period. Similarly, suspensions, syrups and elixirs may contain the active ingredient in admixture with any of the conventional excipients utilized for the preparation of such compositions, e.g. suspending agents (methylcellulose, tragacanth and sodium alginate), wetting agents (lecithin, polyoxyethylene stearate and polyoxyethylene sorbitan mono-oleate) and preservatives (ethyl-p-hydroxybenzoate). Capsules may contain the active ingredient alone or admixed with an inert solid diluent, e.g. calcium carbonate, calcium phosphate and kaolin.

The dosage of active ingredient employed for the tranquilizer and sedative hypnotic use may vary depending on the severity of the condition being treated. However, in general, satisfactory results are obtained when a compound of formula (I) is administered at a daily dosage of from about 2 milligrams to about 200 milligrams per kilogram of animal body weight, preferably given in divided doses 2 to 4 times a day, or in sustained release form. For most larger mammals, (e.g. primates) the total daily dosage is from about 150 to about 2,000 milligrams. Dosage forms suitable for internal use comprise from about 37.5 to about 1,000 milligrams of the active compound, in intimate admixture with a solid or liquid pharmaceutically acceptable carrier or diluent.

EXAMPLE 1

2-amino-5-(2-phenethyl)-1,3,4-thiadiazole.

Step A. 1-(3-phenylpropionyl)-3-thiosemicarbazide.

A mixture of 9.9 g. of 3-phenylpropionylchloride and 4.6 g. of thiosemicarbazide was stirred in 20 ml. of dimethylformamide for 6 hours, at 22°C. The solvent was evaporated and 10 ml. of water and 10 ml. of ether were added to the residue. The precipitate was filtered off to give the intermediate 1-(3-phenylpropionyl)-3-thiosemicarbazide, m.p. 140°-141°C.

Step B. 2-amino-5-(2-phenethyl)-1,3,4-thiadiazole.

A mixture of 5.0 g. of 1-(3-phenylpropionyl)-3-thiosemicarbazide (from Step A) and 5.4 g. of phosphorous tribromide was heated to 60°-65°C. for 2 hours. After cooling, 50 cc. of cold water and then 3 cc. of a 50% sodium hydroxide solution were added. The product, 2-amino-5-(2-phenethyl)-1,3,4-thiadiazole, m.p. 184°-186°C, was precipitated.

EXAMPLE 2

Step A

Following the procedure of Example 1, Step (A), and in place of 3-phenyl-propionylchloride and starting with a. 2-(6-methylphenyl)acetylchloride,
b. 2-(p-methylphenyl)acetylchloride,
c. 2-(5-methylphenyl)acetylchloride, or
d. 2-(2,6-dimethylphenyl)acetylchloride the following intermediates are obtained a. 1-(2-[6-methylphenyl]acetyl)-3-thiosemicarbazide,
b. 1-(2-[p-methylphenyl]acetyl)-3-thiosemicarbazide,
c. 1-(2-[5-methylphenyl]actyl)-3-thiosemicarbazide, or
d. 1-(2-[2,6-dimethylphenyl]acetyl)-3-thiosemicarbazide, respectively.

Step B

Following the procedure of Example 1, Step (B), and starting with the appropriate intermediate of Step (A) of this Example, the following products are obtained a. 2-amino-5-(2-methylbenzyl)-1,3,4-thiadiazole,
b. 2-amino-5-(p-methylbenzyl)-1,3,5-thiadiazole,
c. 2-amino-5-(3-methylbenzyl)-1,3,4-thiadiazole, or
d. 2-amino-5-(2,6-dimethylbenzyl)-1,3,4-thiadiazole, respectively.

EXAMPLE 3

2-amino-5-(2-phenethyl)-1,3,4-thiadiazole.

A mixture of 17.7 g. of 3-phenylpropionylchloride, 8.2 g. of thiosemicarbazide and 8.1 g. of phosphorous tribromide was heated to 60°C., when an exothermic reaction occurred raising the temperature to 100°C. The reaction mixture was cooled to 50° to 60°C. for 20 hours (when the evolution of hydrogen bromide ceased), and 100 cc. of ice water added. The mixture was then treated with 10 cc. of 50% sodium hydroxide solution, the resulting solid was washed with 2N sodium hydroxide solution and water, and the product crystallized from dimethylformamide and water. 2-amino-5-(2-phenethyl)-1,3,4-thiadiazole, m.p. 184°–186°C.

EXAMPLE 4

| Ingredients | Weight (mg) Sterile Injectable Suspension | Oral Liquid Suspension |
|---|---|---|
| 2-amino-5-(2-phenethyl)-1,3,4-thiadiazole | 25 | 25 |
| sodium carboxy methyl cellulose U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47.5 |
| flavor | — | q.s. |
| color | — | q.s. |
| methyl paraben, U.S.P. | — | 4.5 |
| propyl paraben, U.S.P. | — | 1.0 |
| polysorbate 80 (e.g. Tween 80), U.S.P. | — | 5 |
| sorbitol solution, 70%, U.S.P. | — | 2,500 |
| buffer agent to adjust pH for desired stability | q.s. | q.s. |
| water | for injection. q.s. to 1 ml. | q.s. to 5 ml. |

Following the procedure of Example 3, and in place of 3-phenylpropionylchloride and starting with
 a. 2-(6-methylphenyl)acetylchloride,
 b. 2-(p-methylphenyl)acetylchloride,
 c. 2-(5-methylphenyl)acetylchloride, or
 d. 2-(2,6-dimethylphenyl)acetylchloride,
the following products are obtained
 a. 2-amino-5-(2-methylbenzyl)-1,3,4-thiadiazole,
 b. 2-amino-5-(p-methylbenzyl)-1,3,4-thiadiazole,
 c. 2-amino-5-(3-methylbenzyl)-1,3,4-thiadiazole, or
 d. 2-amino-5-(2,6-dimethylbenzyl)-1,3,4-thiadiazole,
respectively.

EXAMPLES 5 and 6

Tablets and Capsules Suitable for Oral Administration.

Tablets and capsules containing the ingredients indicated below may be prepared by conventional techniques and are useful as minor tranquilizers and sedative hypnotics at a dose of one tablet or capsule 2 to 4 times a day.

| Ingredients | Weight (mg) tablet | capsule |
|---|---|---|
| 2-amino-5-(2-phenethyl)-1,3,4-thiadiazole | 25 | 25 |
| tragacanth | 10 | — |
| lactose | 222.5 | 275 |
| corn starch | 25 | — |
| talcum | 15 | — |
| magnesium stearate | 2.5 | — |

Tablets and capsules may be prepared in a similar manner as above employing each of the final products (a), (b), (c) and (d) of Example 4 as the active ingredient.

EXAMPLES 7 and 8

Sterile Suspension for Injection and Oral Liquid Suspension.

The following pharmaceutical compositions are formulated with the indicated amount of active agent using conventional techniques. The injectable suspension and the oral liquid suspension represent formulations useful as unit doses and may be administered as minor tranquilizers and sedative hypnotics. The injectable suspension is suitable for administration once a day whereas the oral liquid suspension is suitably administered 2 to 4 times per day for this purpose.

Sterile injectable suspensions and oral liquid suspensions may be prepared in a similar manner as above employing each of the final products of Example 4, namely (a), (b), (c) or (d) as the active ingredient.

What is claimed is:

1. A method for treating anxiety which comprises administering to a mammal in need of said treatment a tranquilizing effective amount of a compound of the formula

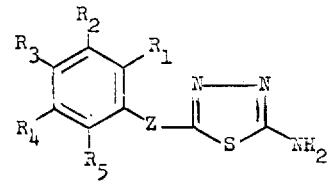

where
 $R_1$, $R_2$, $R_3$, $R_4$ and $R_5$ are independently hydrogen, or lower alkyl having 1 to 4 carbon atoms, and
 Z is —$(CH_2)_n$—
where
 $n$ is 1 or 2.

2. A method according to claim 1 in which the compound is 2-amino-5-(benzyl)-1,3,4-thiadiazole.

3. A method according to claim 1 in which the compound is 2-amino-5-(2-phenethyl)-1,3,4-thiadiazole.

4. A method according to claim 1 in which the compound is 2-amino-5-(2-methylbenzyl)-1,3,4-thiadiazole.

5. A method according to claim 1 in which the compound is 2-amino-5-(p-methylbenzyl)-1,3,4-thiadiazole.

6. A method according to claim 1 in which the compound is 2-amino-5-(3-methylbenzyl)-1,3,4-thiadiazole.

7. A method according to claim 1 wherein the compound is administered orally at a daily dosage of from about 150 milligrams to about 2000 milligrams.

8. A method according to claim 1 wherein the compound is administered in a unit dosage form comprising said compound to the extent of from about 37.5 milligrams to about 1000 milligrams per unit dosage.

9. A pharmaceutical composition useful as a tranquilizing agent comprising as an active ingredient thereof a compound of the formula

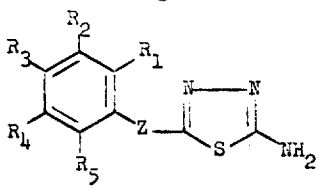

where
$R_1$, $R_2$, $R_3$, $R_4$ and $R_5$ and Z are as defined in claim 1, and a pharmaceutically acceptable carrier therefor, said compound being present in said composition in an amount sufficient to provide a daily dosage of from about 150 milligrams to about 2000 milligrams of said compound.

* * * * *